United States Patent [11] 3,620,922

| [72] | Inventors | Shigeo Abe<br>Tokyo;<br>Akira Furuya, Machida-shi, both of Japan |
|---|---|---|
| [21] | Appl. No. | 777,892 |
| [22] | Filed | Nov. 21, 1968 |
| [45] | Patented | Nov. 16, 1971 |
| [73] | Assignee | Kyowa Hakko Kogyo Co., Ltd.<br>Tokyo, Japan |
| [32] | Priority | Dec. 28, 1967 |
| [33] | | Japan |
| [31] | | 42/83658 |

[54] PROCESS FOR PRODUCING INOSINE
4 Claims, No Drawings

[52] U.S. Cl. .......................................... 195/28 N
[51] Int. Cl. .......................................... C12d 13/06
[50] Field of Search ............................. 195/28 N

[56] References Cited
UNITED STATES PATENTS

| 3,152,966 | 10/1964 | Kinoshita et al. | 195/28 N |
| 3,211,629 | 10/1965 | Abe et al. | 195/28 N |
| 3,265,585 | 8/1966 | Nara et al. | 195/28 N |

Primary Examiner—Alvin E. Tanenholtz
Attorney—Craig, Antonelli, Stewart & Hill

ABSTRACT: A process for producing inosine by fermentation which comprises culturing a biotin-requiring strain of Brevibacterium ammoniagenes or Corynebacterium glutamicum under aerobic conditions in an aqueous nutrient medium. Strains advantageously employed are Brevibacterium ammoniagenes ATCC 21295 and Corynebacterium glutamicum ATCC 21296.

3,620,922

PROCESS FOR PRODUCING INOSINE

This invention relates to a process for producing inosine. More particularly, it relates to a process for the production of inosine by fermentation. Even more particularly, the invention relates to a process for producing inosine by fermentation with mutant strains which require biotin for their growth.

Inosine, which is hypoxanthine riboside, is a compound well known in the art. It is a useful substance, and the art is constantly seeking ways of producing such materials economically by means of industrial processes.

One of the objects of the present invention is to provide an improved process for the production of inosine.

Another object of the present invention is to provide a process for producing inosine by fermentation which may be carried out in an efficacious and simple manner.

A further object of the invention is to provide a process for producing inosine by fermentation which may be carried out advantageously on an industrial scale at low cost to give a high yield of product.

A still further object of the invention is to provide inosine.

These and other objects and advantages of the present invention will become apparent to those skilled in the art from a consideration of the following specification and claims.

In accordance with the present invention, it has been found that significant quantities of inosine can be produced by fermentation by the use of mutant strains of Brevibacterium ammoniagenes and Corynebacterium glutamicum which require biotin for their growth. These mutant micro-organism, employed in the present invention, are obtained by various artificial mutation methods or by natural mutation from Brevibacterium ammoniagenes or Corynebacterium glutamicum as parent strains. The Brevibacterium ammoniagenes and Corynebacterium glutamicum employed as parent strains grow, of course, in a minimum culture medium, having the composition noted hereinbelow.

Minimum culture medium:
20 g. glucose
1 g. $KH_2PO_4$
3 g. $K_2HPO_4$
0.3 g. $MgSO_4 \cdot 7H_2O$
10 mg. $CaCl_2 \cdot 2H_2O$
1 mg. $MnCl_2 \cdot 4H_2O$
10 mg. calcium pantothenate
15 mg. vitamin $B_1$
30 $\mu$g. biotin
2 g. urea
3 g. ammonium sulfate Note: The above components are dissolved in one liter of deionized water. The pH is adjusted to 7.2 before sterilization and urea, separately sterilized from the other components, is added thereto.

The mutant strains employed in the present invention also grow in the minimum culture medium. Furthermore, the mutants have the specific property that the growth thereof is significantly accelerated in a culture medium prepared by adding the following amino acids to the culture medium:
L-alanine
L-arginine
L-aspartic acid
L-cysteine
L-cystine
L-glutamic acid
L-glycine
L-histidine
L-isoleucine
L-leucine
L-lysine
L-methionine
L-phenylalanine
L-proline
L-serine
L-threonine
L-tyrosine
L-tryptophan
L-valine These amino acids are added to the culture medium to give a concentration therein of 20 mg./l. each. Either this mixture of amino acids or the components of nucleic acid, singly or in mixture, may be added to the minimum culture medium in order to obtain a significant acceleration in the growth of the mutants. This conclusion can be clearly seen from the results of growth tests, such as those shown in table 1.

TABLE 1

| | Amount of growth-dried cell bodies (mg./ml.) | | | | | |
|---|---|---|---|---|---|---|
| | Brevibacterium ammoniagenes | | | Corynebacterium glutamicum | | |
| | Parent strain ATCC 6872 | Mutant No. 40101 ATCC 21295 | Adenine-requiring strain ATCC 15187 | Parent strain ATCC 13032 | Mutant No. 40201 ATCC 21296 | Adenine-requiring strain ATCC 14305 |
| Minimum medium | 4.3 | 2.6 | 0 | 5.1 | 3.0 | 0 |
| Minimum medium plus mixture of amino acids | 5.2 | 3.9 | 0 | 5.7 | 4.4 | 0 |
| Minimum medium plus 20 mg./l. of adenine | 4.1 | 3.8 | 3.7 | 5.3 | 4.6 | 4.8 |
| Minimum medium plus 20 mg./l. of guanine | 4.2 | 3.6 | 0 | 5.4 | 4.5 | 0 |

The growth tests on each strain are carried out by putting 10 ml. of the minimum culture medium or the medium prepared by adding the noted substances thereto into large-sized test tubes, respectively, and sterilizing the media under pressure at 120° C. for 15 minutes, adding 0.2 ml. of a cell suspension, prepared by previously culturing each strain and washing it, to each test tube and culturing each strain with aerobic shaking at 30° C. for 48 hours. The amount of micro-organism cells obtained after culturing is then measured.

The mutants employed in the present invention also grow in a minimum culture medium wherein the adenine-requiring strains of Brevibacterium ammoniagenes and Corynebacterium glutamicum used as controls cannot grow. Moreover, as noted above, the growth of the mutants employed in the invention is accelerated by a mixture of amino acids, adenine or guanine. However, the growth of the above-mentioned adenine-requiring strain is noted only by the addition of adenine. From these facts, it is evident that the mutants employed in the present invention differ from the adenine-requiring strain in their basic characteristics. Accordingly, the mutant strains of the invention have been deposited with the American Type Culture Collection and have been given the following catalogue designations:

Brevibacterium ammoniagenes No. 40101 ATCC 21295

Corynebacterium glutamicum No. 40201 ATCC 21296

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, glutamic acid, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, ribonucleic acid, etc., may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

The fermentation or culturing of the micro-organisms is conducted under aerobic conditions, such as aerobic shaking of the culture or with aeration and agitation of a submerged culture, at a temperature of, for example, about 20° to 40° C. and at a pH of, for example, about 4.0 to 9.0. During culturing, it is desirable to adjust the pH of the culture medium with neutralizing agents such as ammonia water, urea solution, sodium hydroxide, etc. After about 2 to 8 days of culturing under these conditions, significant amounts of inosine are accumulated in the resultant culture liquor and in the micro-organism cells.

After the completion of culturing the inosine can be recovered by removing the micro-organism cells from the culture liquor and then treating the liquor with conventional means, such as ion exchange resin treatment, extraction with solvents, precipitation, adsorption, chromatography or the like.

The following examples are given merely as illustrative of the present invention and are not to be considered as limiting. Unless otherwise noted, the percentages therein and throughout the application are by weight per liter of water.

EXAMPLE 1

Brevibacterium ammoniagenes No. 40101 ATCC 21295 is used as the seed micro-organism. It is cultured in a culture medium containing 2 percent glucose, 1 percent peptone, 1 percent meat extract, 0.5 percent yeast extract and 0.3 percent NaCl for 24 hours in order to obtain a seed culture.

The seed culture is inoculated in the ratio of 10 percent by volume into a fermentation medium having the following composition:

100 g. glucose
6 g. urea (separately sterilized)
10 g. KH$_2$PO$_4$
10 g. K$_2$KPO$_4$
10 g. MgSO$_4$·7H$_2$O
0.01 g. FeSO$_4$·7H$_2$O
1 mg. MnSO$_4$·4H$_2$O
0.1 g. CaCl$_2$·2H$_2$O
1 mg. ZnSO$_4$·7H$_2$O
10 g. casamino acid
30 μg. biotin
5 mg. vitamin B$_1$
10 mg. calcium pantothenate The above components are dissolved in one liter of water and the pH is adjusted to 7.5 before sterilization.

Twenty ml. portions of both media are poured into 250-ml. conical flasks, respectively, and are used after sterilization. Culturing is then carried out with aerobic shaking of the culture at 30° C.

The pH of the culture medium during culturing is adjusted to 7.5 with ammonia water. After 110 hours of culturing, 18.4 mg./ml. of inosine is accumulated in the resultant fermentation liquor.

EXAMPLE 2

Corynebacterium glutamicum No. 40201 ATCC 21296 is used as the mutant micro-organism strain. A seed culture thereof is inoculated in a ratio of 10 percent by volume into a fermentation medium having the following composition (per liter of water):

70 g. glucose
1 g. KH$_2$PO$_4$
3 g. K$_2$HPO$_4$
0.3 g. MgSO$_4$·7H$_2$O
5 g. meat extract
6 g. urea (separately sterilized)
30 μg. biotin
5 mg. vitamin B$_1$
10 mg. calcium pantothenate The pH is adjusted to 7.5 before sterilization.

Culturing is carried out under the same conditions as described in example 1, except that the pH of the culture medium during culturing is maintained at about 7.0 by the addition of urea solution. After 96 hours of culturing, 12.7 mg./ml. of inosine is accumulated in the fermentation liquor.

EXAMPLE 3

Brevibacterium ammoniagenes No. 40101 ATCC 21295 is used as the mutant seed micro-organism. Culturing is conducted in the same manner and under the same conditions as described in example 1, the composition of the fermentation medium employed being as follows:

Waste molasses acid hydrolysate (130 g. as glucose)
1 g. KH$_2$PO$_4$
3 g. K$_2$HPO$_4$
5 mg. vitamin B$_1$
10 mg. calcium pantothenate The pH is adjusted to 7.5 before sterilization.

After 96 hours of culturing, 15.9 mg./ml. of inosine is accumulated in the fermentation liquor.

The invention being thus described, it will be obvious that the same may be varied in many ways. Such variations are not to be regarded as a departure from the spirit and scope of the invention, and all such modifications as would be apparent to one skilled in the art are intended to be included.

We claim:

1. A process for producing inosine which comprises culturing a micro-organism selected from the group consisting of Brevibacterium ammoniagenes ATCC 21295 and Corynebacterium glutamicum ATCC 21296 under aerobic conditions in an aqueous nutrient medium containing a growth-requisite amount of biotin for said micro-organism, accumulating inosine in the resultant culture liquor, and recovering said inosine therefrom.

2. The process of claim 1, wherein culturing in carried out at a temperature of about 20° to 40° C. and at a pH of about 4.0 to 9.0.

3. The process of claim 2, wherein said micro-organism is Brevibacterium ammoniagenes ATCC 21295.

4. The process of claim 2, wherein said micro-organism is Corynebacterium glutamicum ATCC 21296.

* * * * *